United States Patent
Katsma

[11] Patent Number: 5,416,955
[45] Date of Patent: *May 23, 1995

[54] TRIGGER-CLOSING CARABINER

[76] Inventor: Robert W. Katsma, 615 Scenic View Dr., College Place, Wash. 99324-1749

[*] Notice: The portion of the term of this patent subsequent to May 18, 2010 has been disclaimed.

[21] Appl. No.: 57,273

[22] Filed: May 4, 1993

Related U.S. Application Data

[63] Continuation-in-part of Ser. No. 876,960, Apr. 30, 1992, Pat. No. 5,210,914.

[51] Int. Cl.⁶ ............................................... A63B 29/00
[52] U.S. Cl. .................................. 24/573.5; 24/598.2; 24/599.6; 24/600.3; 24/599.7
[58] Field of Search ................. 24/573.5, 599.4, 599.5, 24/599.6, 599.7, 600.3, 598.2, 602

[56] References Cited

U.S. PATENT DOCUMENTS

| | | |
|---|---|---|
| 184,709 | 11/1876 | Haines . |
| 1,310,548 | 7/1919 | Sandstrom . |
| 1,409,068 | 3/1992 | Simpson . |
| 4,802,264 | 2/1989 | Isenhart . |
| 5,005,266 | 4/1991 | Fister et al. . |
| 5,210,914 | 5/1993 | Katsma ................................ 24/573.5 |

*Primary Examiner*—James R. Brittain

[57] ABSTRACT

A carabiner having a body which forms a part of a loop. A gate is connected to the body and forms a closed loop configuration therewith when the gate is in the closed position. A trigger is provided to release the gate from an open position. The trigger operates at the pivot end of the gate, preferably working in conjunction with a biasing spring. The preferred biasing spring holds the gate in an open position until the gate is activated to release. The biasing spring also preferably forces the gate into the closed position.

28 Claims, 6 Drawing Sheets

5,416,955

TRIGGER-CLOSING CARABINER

CROSS-REFERENCE TO RELATED APPLICATION

This is a continuation-in-part of Ser. No. 07/876,960, filed 30 Apr. 1992, now U.S. Pat. No. 5,210,914.

FIELD OF THE INVENTION

This invention relates to carabiners that are used in combination with ropes by mountaineers or climbers to ensure safety.

DESCRIPTION OF THE PRIOR ART

For safety in case of a fall, climbers attach a rope to themselves and have a partner who is secure in position to hold the rope. Often the climber is above the person holding the rope. Therefore, the climber has to attach the rope to the mountain so that the rope is free to move with the climber, but the rope must hold the climber through the action of the partner in case of a fall. The device that is used to make the connection between the rope and another element that is attached directly to the mountain is a carabiner. A carabiner is a closed loop having a gate which can be opened or closed to allow entry of a rope or other connection member. Most typically, a carabiner is formed as a C-shaped element with a gate bridging the opening to make the closed connector.

Because of the time required to attach some element directly to the mountain and then make the connection to the rope with a carabiner the climber has to be in a secure position. When climbers do harder routes the positions of the climbers are less secure, and attaching their rope to the mountain needs to be as efficient as possible. In some cases, the element that is attached directly to the mountain and the accompanying carabiner are in place before the climber climbs, and it is left for the climber to simply attach the rope to the carabiner.

In an effort to make the process of attaching the rope to the carabiner as easy as possible, Fister and Grosset describe a self-closing carabiner in U.S. Pat. No. 5,005,266 (9 Apr. 1991). Although the invention is self-closing, it does suffer from at least two serious disadvantages:

(a) The gate of the carabiner is propped open by a tongue. Aligning the end of the tongue with the end of the gate during a climb is difficult. Therefore, the usefulness of Fister's carabiner is limited to applications where it can be prepared for use by propping the gate open before the climb.

(b) The tongue mechanism of the Fister and Grosset carabiner is located in the part of the carabiner that must take high pressure contact with the rope in the event that the climber falls. Therefore, the tongue is likely to get damaged. Even worse, a damaged tongue might damage the rope.

A solution to the above problem (a) is described by Isenhart in U.S. Pat. No. 4,802,264 (7 Feb. 1989). Isenhart describes a gate that includes an over-center linkage to bias the gate toward either the open or closed position (away from the half-open position). The problem with this invention is that it is not self-closing.

OBJECTS AND ADVANTAGES OF THE INVENTION

Accordingly, several objects and advantages of the present invention are as follows:

(a) to provide a self-closing carabiner that is easy to use during a climb;

(b) to provide a self-closing carabiner that is not prone to damage;

(c) to provide a self-closing carabiner that has no increased risk of damaging the rope.

Still further objects and advantages will become apparent from a consideration of the ensuing description and drawings.

Figure 1:
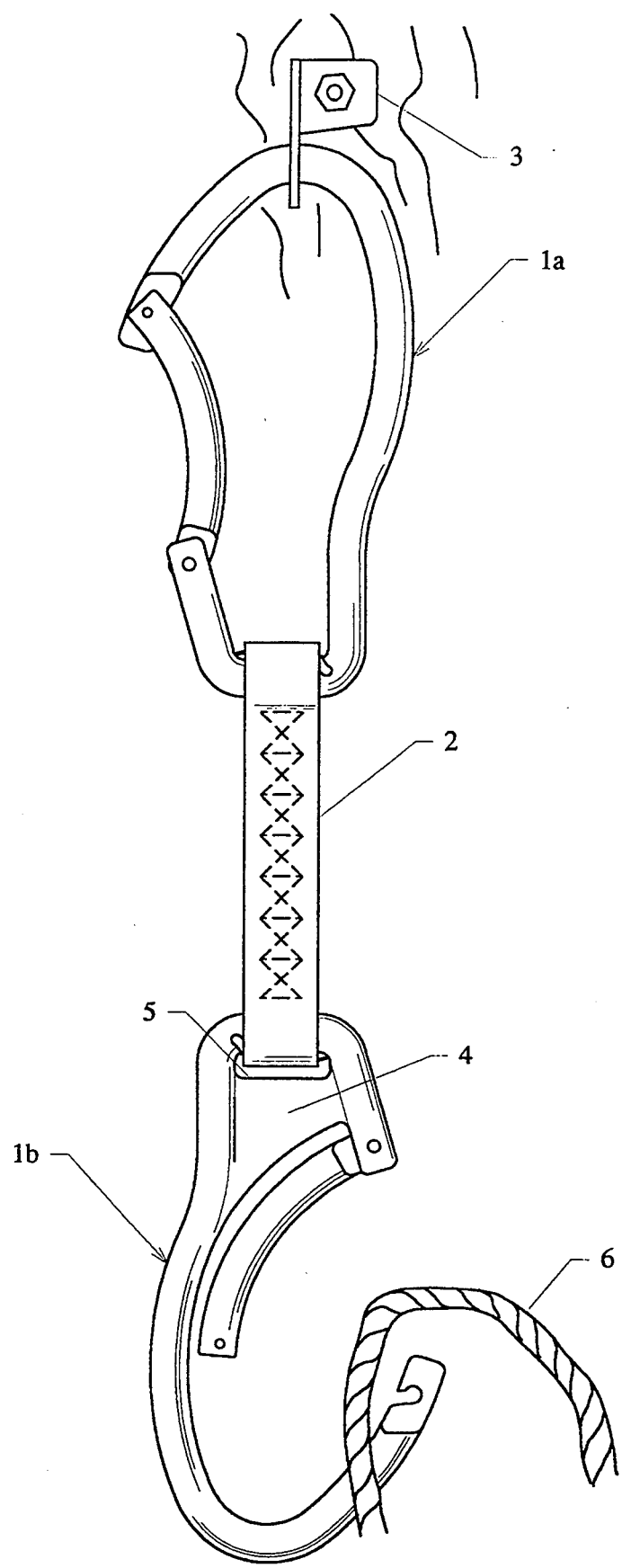
FIG. 1 is a side view of two carabiners of the present invention connected by a strap.
Figure 2:
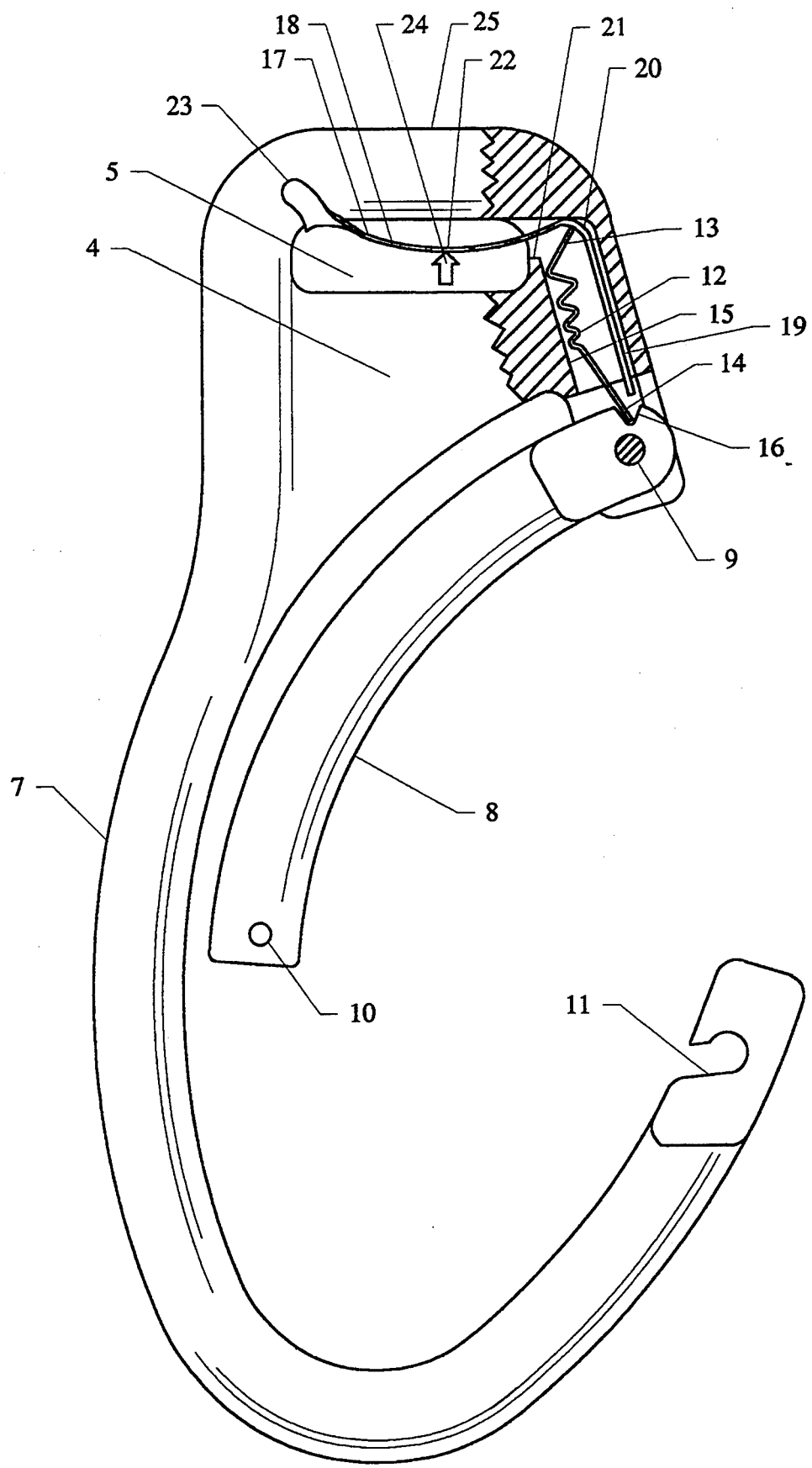
FIG. 2 is a side view of an embodiment of the present invention that shows part of the body of the carabiner sectioned to expose the gate-triggering mechanism.

| Reference Numerals In Drawings | |
|---|---|
| FIG. 1 | |
| 1a | top carabiner |
| 1b | bottom carabiner |
| 2 | strap |
| 3 | anchor |
| 4 | web |
| 5 | strap aperture |
| 6 | rope |
| FIG. 2 | |
| 4 | web |
| 5 | strap aperture |
| 7 | body |
| 8 | gate |
| 9 | gate pivot |
| 10 | pin |
| 11 | notch |
| 12 | biasing spring |
| 13 | spring section |
| 14 | linear end section |
| 15 | axial bore |
| 16 | groove |
| 17 | trigger |
| 18 | lever section |

Figure 3:
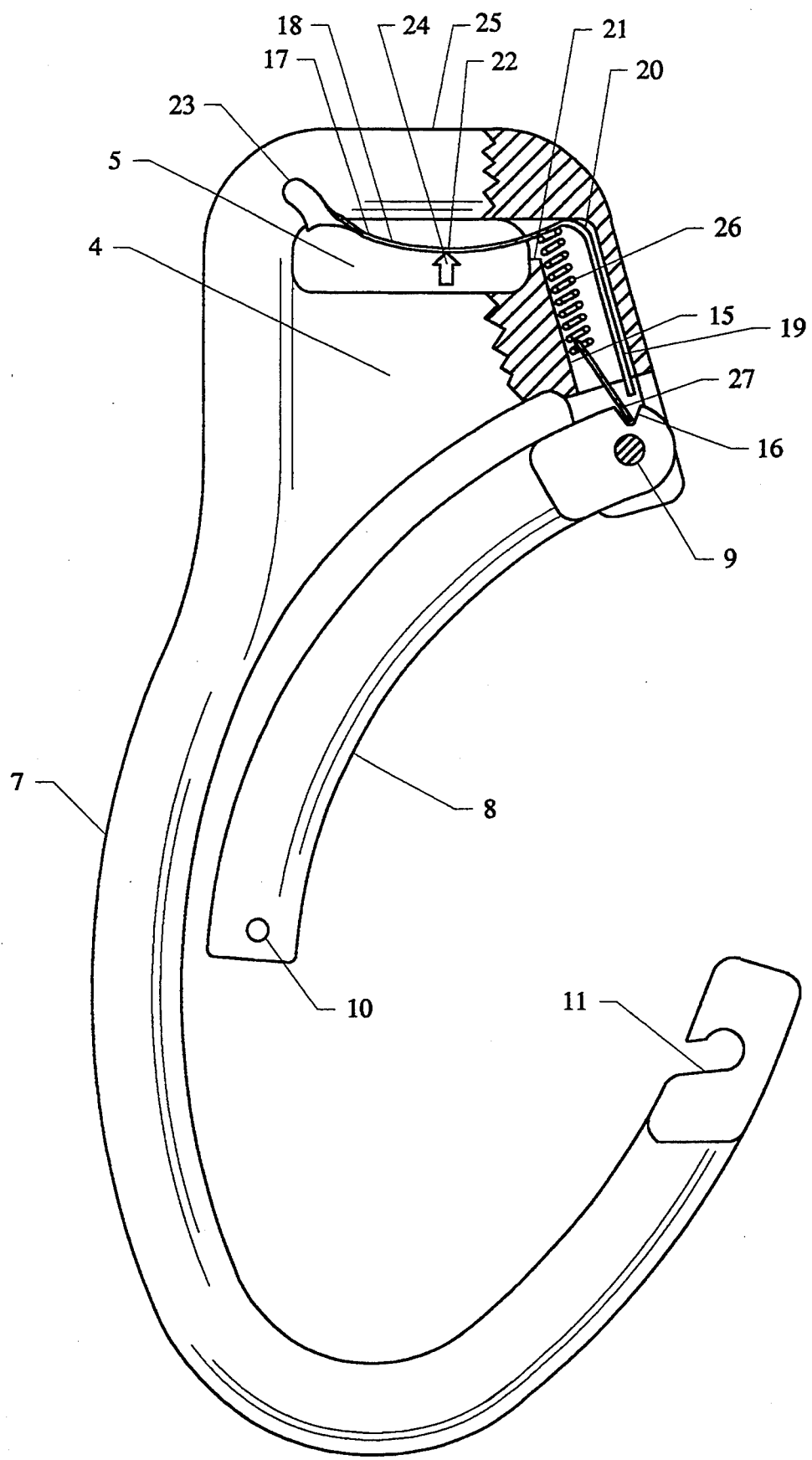
FIG. 3 is a side view of a another embodiment of the present invention that shows part of the body of the carabiner sectioned to expose the gate-triggering mechanism. The coil spring is also shown sectioned; because of the small size, however, hatch lines were not used.
Figure 4:
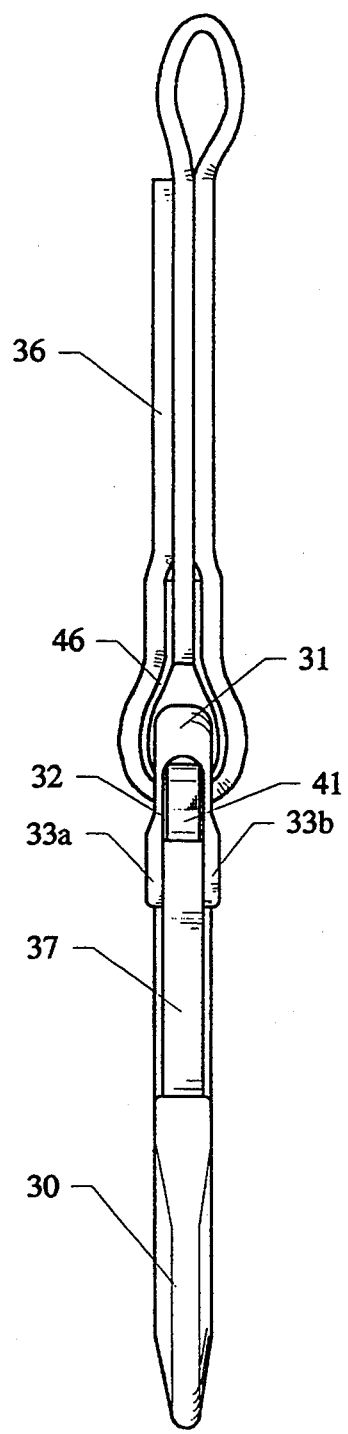
FIG. 4 is a front view of the preferred embodiment of the present invention with a strap.
Figure 5:
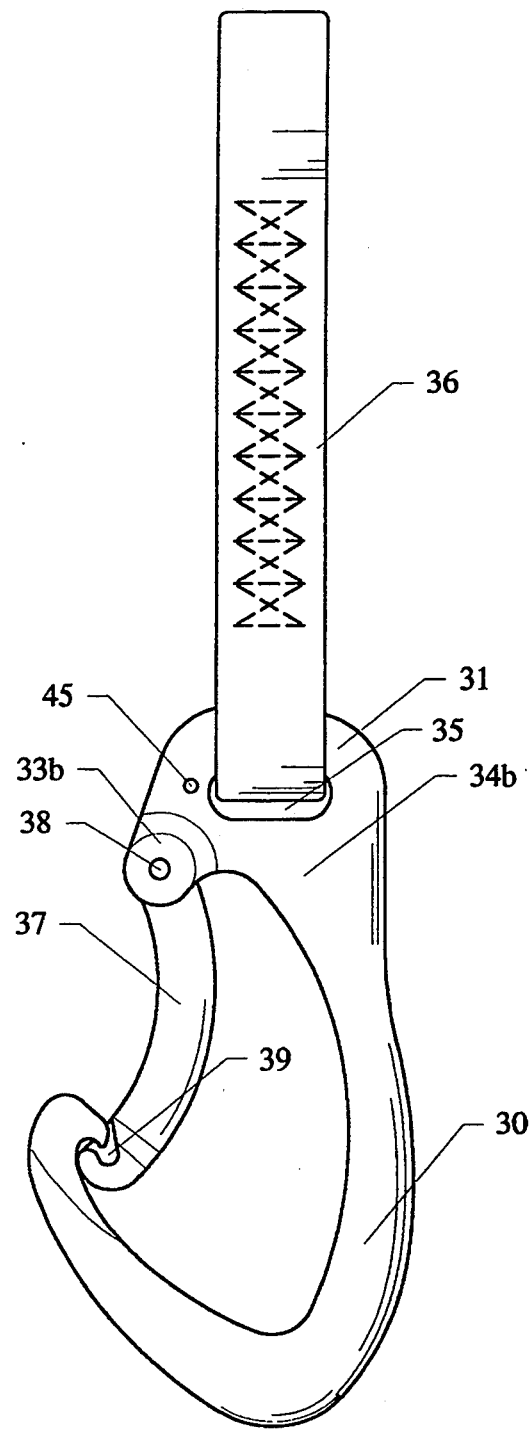
FIG. 5 is a side view of the preferred embodiment of the present invention with a strap.
Figure 6:
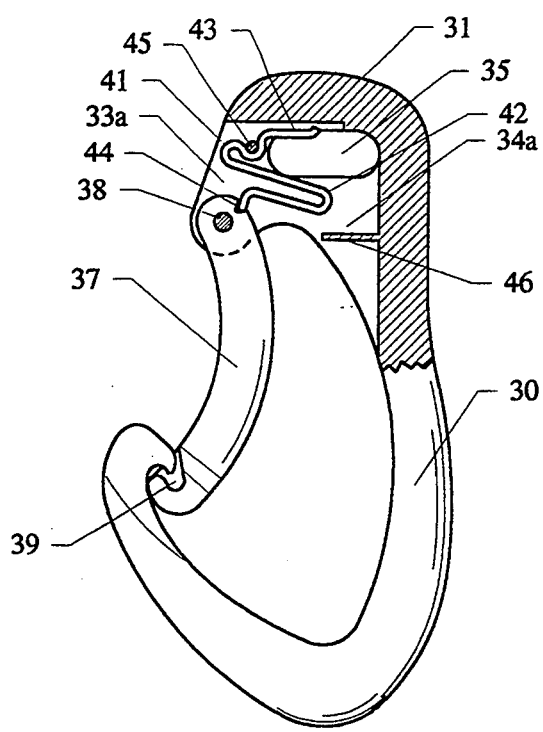
FIG. 6 is a side view of the preferred embodiment of the present invention that shows part of the body of the carabiner sectioned to expose the gate-triggering mechanism. The gate is shown in the closed position.
Figure 7:
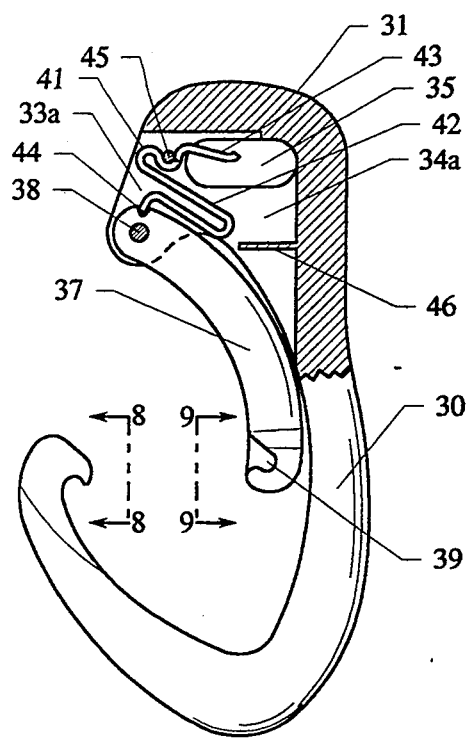
FIG. 7 is a side view of the preferred embodiment of the present invention that shows part of the body of the carabiner sectioned to expose the gate-triggering mechanism. The gate is shown in the open position.
Figure 8:
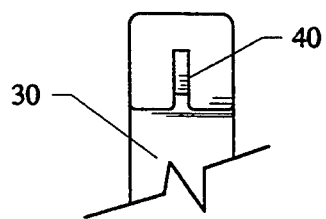
FIG. 8 is a detail of the hook on the body of the preferred embodiment of the present invention.
Figure 9:
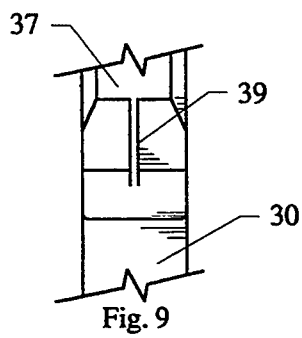
FIG. 9 is a detail of the hook on the gate of the preferred embodiment of the present invention.
Figure 10:
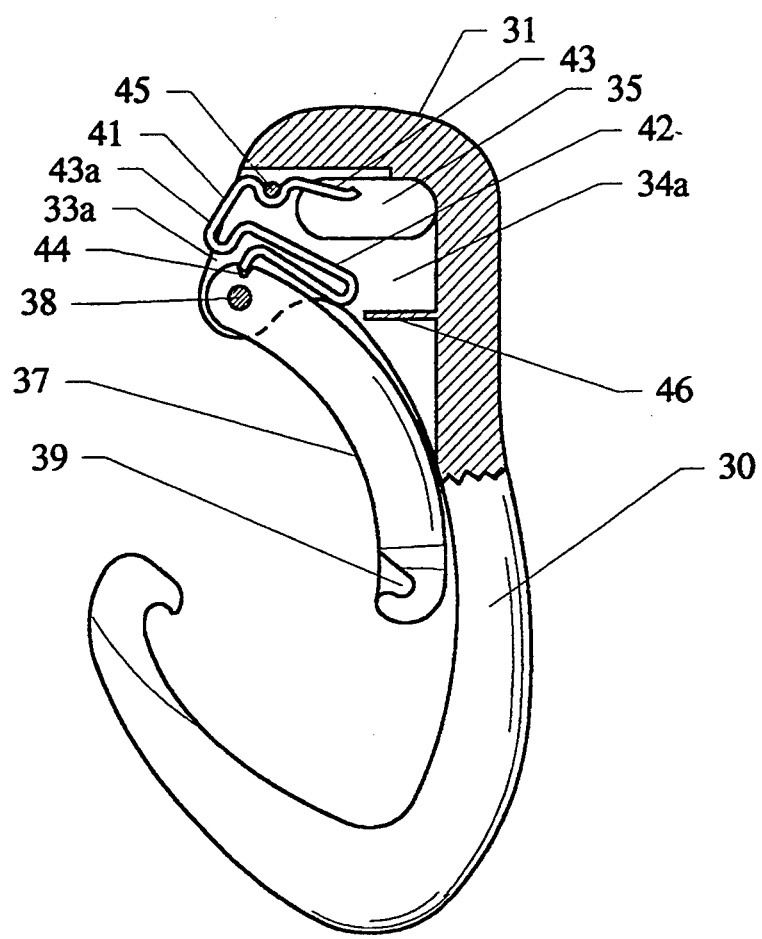
FIG. 10 is a side view of another embodiment of the present invention that shows part of the body of the carabiner sectioned to expose the gate-triggering mechanism. The gate is shown in the open position.

| | -continued |
|---|---|
| Reference Numerals In Drawings | |
| 19 | pushing section |
| 20 | elbow |
| 21 | transverse bore |
| 22 | resilient section |
| 23 | saddle |
| 24 | arrow |
| 25 | strap section |
| FIG. 3 | |
| 4 | web |
| 5 | strap aperture |
| 7 | body |
| 8 | gate |
| 9 | gate pivot |
| 10 | pin |
| 11 | notch |
| 15 | axial bore |
| 16 | groove |
| 17 | trigger |
| 18 | lever section |
| 19 | pushing section |
| 20 | elbow |
| 21 | transverse bore |
| 22 | resilient section |
| 23 | saddle |
| 24 | arrow |
| 25 | strap section |
| 26 | compression coil spring |
| 27 | shank |
| FIG. 4 | |
| 30 | body |
| 31 | strap section |
| 32 | slot |
| 33a | left hinge section |
| 33b | right hinge section |
| 36 | strap |
| 37 | gate |
| 41 | trigger |
| 46 | strap protector |
| FIG. 5 | |
| 30 | body |
| 31 | strap section |
| 33b | right hinge section |
| 34b | right web |
| 35 | strap aperture |
| 36 | strap |
| 37 | gate |
| 38 | gate pivot |
| 39 | flange |
| 40 | trigger pivot |
| FIG. 6 and FIG. 7 | |
| 30 | body |
| 31 | strap section |
| 33a | left hinge section |
| 34a | left web |
| 35 | strap aperture |
| 37 | gate |
| 38 | gate pivot |
| 39 | flange |
| 41 | trigger |
| 42 | biasing section |
| 43 | lever section |
| 44 | groove |
| 45 | trigger pivot |
| 46 | gusset |
| FIG. 8 | |
| 30 | body |
| 40 | cleft |
| FIG. 9 | |
| 30 | body |
| 37 | gate |
| 39 | flange |
| FIG. 10 | |
| 30 | body |
| 31 | strap section |
| 33a | left hinge section |
| 34a | left web |
| 35 | strap aperture |
| 37 | gate |
| 38 | gate pivot |

| | -continued |
|---|---|
| Reference Numerals In Drawings | |
| 39 | flange |
| 41 | trigger |
| 42 | biasing section |
| 43 | lever section |
| 43a | manual activation section |
| 44 | groove |
| 45 | trigger pivot |
| 46 | gusset |

DESCRIPTION OF THE INVENTION

Two embodiments of the carabiner of the present invention are illustrated in FIG. 1. A carabiner (1a) is shown connected by a strap (2) to a carabiner (1b) as is often the case in actual use. Because carabiner (1a) is connected to an anchor (3) in the rock and is not used with a rope, it is not necessary that carabiner (1a) have the self-closing feature of the present invention. For illustrative purposes, however, carabiner (1a) is shown as an embodiment of the present invention. Carabiner (1b) differs from carabiner (1a) in the addition of a web (4) that strengthens the carabiner and forms a strap aperture (5). Carabiner (1b) is shown prepared for the entrance of a rope (6).

Embodiment of FIG. 2.

Carabiner (1b) is illustrated in more detail in FIG. 2. The carabiner includes a body (7) that is generally C-shaped with a strap section (25) that is approximately cylindrical and shifted distally in a continuous and smooth manner from the remainder of body (7). Body (7) also includes web (4) joining the parts of the body on each side of strap section (25). Web (4) in combination with strap section (25) form strap aperture (5) for strap (2). See FIG. 1 for strap (2). The opening of the carabiner is bridged by a gate (8) that is illustrated in the open position. Gate (8) has a pivot end adjacent to a gate pivot (9). The gate rotates about gate pivot (9) so that when the gate is closed a pin (10) which is mounted or formed at the distal end of the gate, rests in a notch (11). Gate (8) is biased toward the open or closed position (away from a three-fourths-open position) by an over-center linkage.

The over-center linkage comprises a biasing spring (12) made from flat wire, having a spring section (13) and a linear end section (14), that works in combination with gate (8) and body (7). Biasing spring (12) is confined within an axial bore (15) in body (7) as shown in section view. Linear end section (14) of biasing spring (12) is further located by a groove (16) in gate (8).

A trigger (17) is an L-shaped flat-wire element with a lever section (18) and a pushing section (19) joined by an elbow (20). Lever section (18) extends adjacent to strap section (25) of body (7), between strap (2) and strap section (25), and through a transverse bore (21) to axial bore (15). See FIG. 1 for strap (2). Pushing section (19) extends in axial bore (15) adjacent and distal to biasing spring (12) nearly to the end of linear end section (14) but not interfering with gate (8). Trigger (17) is stiff except for a resilient section (22) located in the center region of lever section (18). Trigger (17) is held in position by axial bore (15) and by a saddle (23) that conforms to the locally cylindrical cross-section of body (7). Trigger (17) is additionally positioned by the force from spring section (13) of biasing spring (12).

Embodiment of FIG. 3.

Another embodiment is shown in FIG. 3. It is different in that biasing spring (12) of the embodiment shown in FIG. 2 has been eliminated and replaced by two parts, a compression coil spring (26) and a shank (27).
Preferred embodiment shown in FIG. 4 to FIG. 9.

The preferred embodiment of the present invention is illustrated in FIG. 4 to FIG. 9. The carabiner includes a body (30) that is generally C-shaped with a strap section (31) that is shifted distally in a continuous and smooth manner from the remainder of body (30). Body (30) has a slot (32) parallel and medial to a left hinge section (33a) and a right hinge section (33b). A left web (34a) joins left hinge section (33a) with body (30) on the other side of strap section (31). A tight web (34b) joins right hinge section (33b) with body (30) on the other side of strap section (31). Left web (34a), fight web (34b), and strap section (31) form a strap aperture (35) for a strap (36). Left web (34a) and right web (34b) are joined together and stiffened by a gusset (46). The opening of the carabiner is bridged by a gate (37). Gate (37) rotates about a gate pivot (38) so that when the gate is closed a flange (39) rests in a cleft (40). This gate engagement construction at the distal end thereof and the mating part of the body, provides resistance against lateral forces which are applied to the gate relative to the body. See FIG. 8 and FIG. 9. Gate (37) is biased toward the open or closed position (away from a three-fourths-open position) by an over-center linkage.

The over-center linkage comprises a trigger (41) made from flat wire, having a biasing section (42) and a lever section (43), that works in combination with a groove (44) in gate (37) and a trigger pivot (45). Biasing section (42) has a serpentine shape between groove (44) and trigger pivot (45). Lever section (43) extends along the medial border of strap section (31) in strap aperture (35), between strap section (31) and a strap protector (46). Where biasing section (42) and lever section (43) join is a half-circle shape that rests against trigger pivot (45). The force of biasing section (42) between groove (44) and trigger pivot (45) holds trigger (41) in place. Strap (36) is protected from lever section (43) by strap protector (46).
Embodiment of FIG. 10.

Another embodiment is shown in FIG. 10. It is similar to the preferred embodiment shown in FIG. 4 to FIG. 9. The primary difference is that a manual activation section (43a) is provided with exposed surfaces which can be used to manually displace the trigger. This can be used instead of the lever section (43) of trigger (41 ) which is alternatively activated by applying a load using a connecting strap or other connecting member (not shown in FIG. 10).

OPERATION OF THE INVENTION

Embodiment of FIG. 2.

Gate (8) is pushed open by the user against the force of biasing spring (12). As gate (8) crosses over the approximately three-quarters-open position, groove (16) will cross over the center-line between gate pivot (9) and biasing spring (12), and the gate will be forced to the open position by biasing spring (12). It is now a simple matter for the climber to place the rope in the carabiner. To close the carabiner the climber simply pulls down on the rope. The act of pulling down on the rope or carabiner against the force from strap (2) will force lever section (18) of trigger (17) toward strap section (25) of body (7), as shown by an arrow (24). Lever section (18) will bend in resilient section (22). This will cause pushing section (19) of trigger (17) to rotate clockwise about elbow (20) and push linear end section (14) of biasing spring (12) to the left. Since linear end section (14) of biasing spring (12) is located in groove (16), gate (8) will be forced to rotate counterclockwise against the force of biasing spring (12). But as groove (16) crosses over the center-line between gate pivot (9) and biasing spring (12), gate (8) will be forced to the closed position by the biasing spring. It is clear that the user could manually move gate (8) toward the closed position, if for some reason pulling down on the carabiner was undesirable.
Embodiment of FIG. 3.

This embodiment operates the same as the embodiment of FIG. 2. The only difference is that compression coil spring (26) and shank (27) do the work that was done by biasing spring (12) in the embodiment of FIG. 2.
Preferred embodiment shown in FIG. 4 to FIG. 9.

Gate (37) is pushed open by the user against the force of biasing section (42) of trigger (41). As gate (37) crosses over the approximately three-quarters-open position, groove (44) will cross over the center-line between trigger pivot (45) and gate pivot (38), and the gate will be forced to the open position by biasing section (42). It is now a simple matter for the climber to place the rope in the carabiner. To close the carabiner, the climber simply pulls down on the carabiner. The act of pulling down on the carabiner against the force from strap (36) will force lever section (43) toward strap section (31). This will cause trigger (41) to rotate counterclockwise about trigger pivot (45) and push biasing section (42) to the right. Since the end of biasing section (42) is located in groove (44), gate (37) will be forced to rotate clockwise against the force of biasing section (42). But as groove (44) crosses over the center-line between trigger pivot (45) and gate pivot (38), gate (37) will be forced to the closed position by biasing section (42). It is clear that the user could manually move gate (37) toward the closed position, if for some reason pulling down on the carabiner was undesirable.
Alternate design of the preferred embodiment of FIG. 4 to FIG. 9.

It is also possible that the center of the over-center mechanism be designed to occur at the full open position of gate (37). That is, when gate (37) is in the full open position, groove (44) will be on the center-line between trigger pivot (45) and gate pivot (38). In this case, gate (37) is not biased to the open position but instead is held there by the friction caused by the force from biasing section (42) of trigger (41 ). It is now a simple matter for the climber to place the rope in the carabiner. To close the carabiner, the climber simply pulls down on the carabiner. The act of pulling down on the carabiner against the force from strap (36) will force lever section (43) toward strap section (31). This will cause trigger (41) to rotate counterclockwise about trigger pivot (45) and push biasing section (42) to the right. Since the end of biasing section (42) is located in groove (44), gate (37) will be forced to rotate clockwise against the frictional forces caused by trigger (41). But as groove (44) moves substantially away from the center-line between trigger pivot (45) and gate pivot (38), gate (37) will be forced to the closed position by biasing section (42).
Embodiment of FIG. 10.

This embodiment operates similar to the preferred embodiment of FIG. 4 to FIG. 9. The primary difference is that the manual activation section (43a) is provided with exposed surfaces which can be manually displaced to activate the trigger. This can be used instead of the lever section (43) of trigger (41) which is alternatively capable of activation by applying a load using a connecting strap or other connecting member (not shown in FIG. 10).

SUMMARY, RAMIFICATIONS, AND SCOPE

Accordingly, the reader will see that this invention provides for a self-closing carabiner that is easy to use. It is not necessary for the climber to align a prop to hold the gate open. The climber simply opens the gate past the three-quarter-open position, and the gate is held open. Closing the carabiner is a simple matter of activating a trigger. Furthermore, the trigger is in a protected place so that it is not prone to damage. And even more important, the trigger cannot damage the rope.

While my above description contains many specificities, these should not be construed as limitations on the scope of the invention, but rather as an exemplification of embodiments thereof. Other variations are possible. Also, this invention is not limited to use in climbing or mountaineering but may have application in other fields such as rescue operations. Accordingly, the scope of this invention should be determined not by the embodiments illustrated but by the appended claims and their legal equivalents.

Having described my invention, what I claim as new and desire to secure by Letters Patent is:

1. A carabiner, comprising:
   a body forming a portion of a loop;
   a gate connected to the body for movement between open positions and a closed position; the body and gate forming a closed loop configuration when the gate is in said closed position;
   a gate biasing means for biasing the gate toward a closed position for a range of partially open positions of the gate, and for biasing the gate to maintain an open position of the gate;
   a trigger which can be controllably activated to cause the gate to move from an open position and into the closed position.

2. A carabiner according to claim 1 wherein said trigger is constructed so that the trigger is activated by applying a load to the carabiner.

3. A carabiner according to claim 1 wherein said trigger is constructed to allow manual control to activate the trigger.

4. A carabiner according to claim 1 wherein said trigger includes exposed trigger surfaces which can be manually displaced to activate the trigger.

5. A carabiner according to claim 1 wherein said trigger is constructed so that the trigger can alternatively be activated by applying a load to the carabiner, or by manual displacement to activate the trigger.

6. A carabiner according to claim 1 wherein said trigger is constructed so that the trigger is activated by pulling upon a connecting member trained through an aperture formed in the body.

7. A carabiner according to claim 1 wherein the trigger includes a deformable member which is displaced to cause activation of the trigger.

8. A carabiner according to claim 1 wherein the trigger includes a member which is displaced to apply force through the gate biasing means.

9. A carabiner according to claim 1 wherein the trigger and gate biasing means are formed from a single member.

10. A carabiner according to claim 1 wherein the trigger and gate biasing means are formed from a single convoluted spring member.

11. A carabiner according to claim 1 wherein the trigger and gate biasing means are formed from a single convoluted spring member which pivots when activated.

12. A carabiner according to claim 1 wherein the trigger is pivotally connected to the body.

13. A carabiner according to claim 1 wherein the gate biasing means is an over-center spring mechanism.

14. A carabiner according to claim 1 wherein a distal end of the gate detachably engages the body using a gate engagement construction which resists lateral forces.

15. A carabiner, comprising:
    a body forming a portion of a loop;
    a gate pivotally connected to the body at a pivot end of the gate; said gate being capable of pivotal movement between open positions and a closed position; the body and gate forming a closed loop configuration when the gate is in said closed position;
    a gate biasing means for biasing the gate toward at least a closed position;
    a trigger connected to the body; the trigger being constructed to apply force to the pivot end of the gate to displace the gate and cause the gate to move from an open position and into the closed position.

16. A carabiner according to claim 15 wherein said trigger is constructed so that the trigger is activated by applying a load to the carabiner.

17. A carabiner according to claim 15 wherein said trigger is constructed to allow manual control to activate the trigger.

18. A carabiner according to claim 15 wherein said trigger includes exposed trigger surfaces which can be manually displaced to activate the trigger.

19. A carabiner according to claim 15 wherein said trigger is constructed so that the trigger can alternatively be activated by applying a load to the carabiner, or by manual displacement to activate the trigger.

20. A carabiner according to claim 15 wherein said trigger is constructed so that the trigger is activated by pulling upon a connecting member trained through an aperture formed in the body.

21. A carabiner according to claim 15 wherein the trigger includes a deformable member which is displaced to cause activation of the trigger.

22. A carabiner according to claim 15 wherein the trigger includes a member which is displaced to apply force through the gate biasing means.

23. A carabiner according to claim 15 wherein the trigger and gate biasing means are formed from a single member.

24. A carabiner according to claim 15 wherein the trigger and gate biasing means are formed frown a single convoluted spring member.

25. A carabiner according to claim 15 wherein the trigger and gate biasing means are formed from a single convoluted spring member which pivots when activated.

26. A carabiner according to claim 15 wherein the trigger is pivotally connected to the body.

27. A carabiner according to claim 15 wherein the gate biasing means is an over-center spring mechanism.

28. A carabiner according to claim 15 wherein a distal end of the gate detachably engages the body using a gate engagement construction which resists lateral forces.

* * * * *